(12) United States Patent
Nakamoto

(10) Patent No.: US 10,719,745 B2
(45) Date of Patent: Jul. 21, 2020

(54) INFORMATION PROCESSING APPARATUS, COMMUNICATION METHOD, AND SYSTEM

(71) Applicant: CANON KABUSHIKI KAISHA, Tokyo (JP)

(72) Inventor: Juri Nakamoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/453,285

(22) Filed: Jun. 26, 2019

(65) Prior Publication Data

US 2020/0005102 A1 Jan. 2, 2020

(30) Foreign Application Priority Data

Jun. 29, 2018 (JP) ................................. 2018-125279

(51) Int. Cl.
*G06K 15/00* (2006.01)
*H04L 29/08* (2006.01)
*H04N 1/00* (2006.01)

(52) U.S. Cl.
CPC ............ *G06K 15/007* (2013.01); *H04L 67/16* (2013.01); *H04N 1/00103* (2013.01); *H04N 1/00411* (2013.01); *H04N 1/00413* (2013.01); *H04N 2201/0094* (2013.01)

(58) Field of Classification Search
CPC .............................. G06K 15/007; H04L 67/16
See application file for complete search history.

(56) References Cited

U.S. PATENT DOCUMENTS

| | | | | |
|---|---|---|---|---|
| 8,576,422 B2* | 11/2013 | Kimura | ................. | G06F 3/1204 358/1.14 |
| 8,755,065 B2 | 6/2014 | Kimura | | |
| 9,001,370 B1* | 4/2015 | Nuggehalli | ............. | H04L 63/08 358/1.15 |
| 9,041,968 B2 | 5/2015 | Kimura | | |
| 9,354,828 B2 | 5/2016 | Kimura | | |
| 2008/0270911 A1* | 10/2008 | Dantwala | ............... | G06Q 10/10 715/741 |
| 2018/0088883 A1* | 3/2018 | Hashimoto | ................ | B41J 3/46 |

FOREIGN PATENT DOCUMENTS

JP 2010-160579 A 7/2010

* cited by examiner

*Primary Examiner* — Ibrahim Siddo
(74) *Attorney, Agent, or Firm* — Venable LLP

(57) ABSTRACT

Apparatus information of a printing apparatus is obtained from a printing apparatus, and a user interface screen of the printing apparatus is displayed. In accordance with receiving an instruction to register to a Web service from the user interface screen, obtained apparatus information of the printing apparatus is transmitted to a server, and an instruction for execution of a predetermined setting related to the Web service is made to the printing apparatus. Both the transmission and the instruction are executed in accordance with the instruction to register.

18 Claims, 8 Drawing Sheets

FIG. 7

MG99999 Series RemoteUI TOP PAGE

MENU

MAIN UNIT SETTINGS

MFP USAGE

LAN SETTINGS

Web SERVICE REGISTRATION —702 http://www.canon.co.jp/web-service/regist.do?id=ABCDEF1234567890&settingurl=http://172.21.93.180/settingstart

FIG. 8

Web SERVICE REGISTRATION PAGE

SERIAL NUMBER   ABCDEF1234567890

USAGE PLAN   PLAN A ▽

REGISTER

INFORMATION PROCESSING APPARATUS, COMMUNICATION METHOD, AND SYSTEM

BACKGROUND OF THE INVENTION

Field of the Invention

The present invention is related to an information processing apparatus that can execute registration to a Web service, a communication method, and a system.

Description of the Related Art

As a method for using, on an information device such as a printer, a Web service provided over the Internet, there is a method in which device identification information by which the information device can be identified is inputted into a Web service provision apparatus, and an initial setting for starting to use the Web service are performed on the information device side. Thereby, the service becomes usable.

In Japanese Patent Laid-Open No. 2010-160579, a print system in which a printing apparatus used in a print service provided by a print server is registered to the print server is described. Also, in Japanese Patent Laid-Open No. 2010-160579, it is described that the client terminal transmits to the print server configuration information of the printing apparatus obtained from the printing apparatus.

However, hypothetically, even if a setting for using a service in a printing apparatus is necessary, in Japanese Patent Laid-Open No. 2010-160579, there is the need to perform those settings separately to registration of the printing apparatus to the server.

SUMMARY OF THE INVENTION

An aspect of the present invention is to eliminate the above-mentioned problems with the conventional technology. The present invention provides an information processing apparatus, a communication method, and a system for improving convenience in a case where a Web service is used.

The present invention in one aspect provides a communication method executed by a printing apparatus and an information processing apparatus operable to communicate with the printing apparatus and a server for providing a Web service, the method comprising: obtaining, by the information processing apparatus from the printing apparatus, apparatus information of the printing apparatus; displaying, by the information processing apparatus, a user interface screen of the printing apparatus; in accordance with receiving an instruction to register to the Web service from the user interface screen, transmitting, by the information processing apparatus, to the server the apparatus information of the obtained printing apparatus; and making an instruction, by the information processing apparatus to the printing apparatus, for execution of a predetermined setting related to the Web service, wherein, both the transmission and the instruction are executed in accordance with the instruction to register.

By virtue of the present invention, it is possible to improve convenience in a case where a Web service is used.

Further features of the present invention will become apparent from the following description of exemplary embodiments with reference to the attached drawings.

BRIEF DESCRIPTION OF THE DRAWINGS

FIG. 7 is a view illustrating a screen of a TOP page of Remote UI of an MFP.

FIG. 8 is a view illustrating a screen of a flat-rate printing service registration page.

DESCRIPTION OF THE EMBODIMENTS

Figure 1:
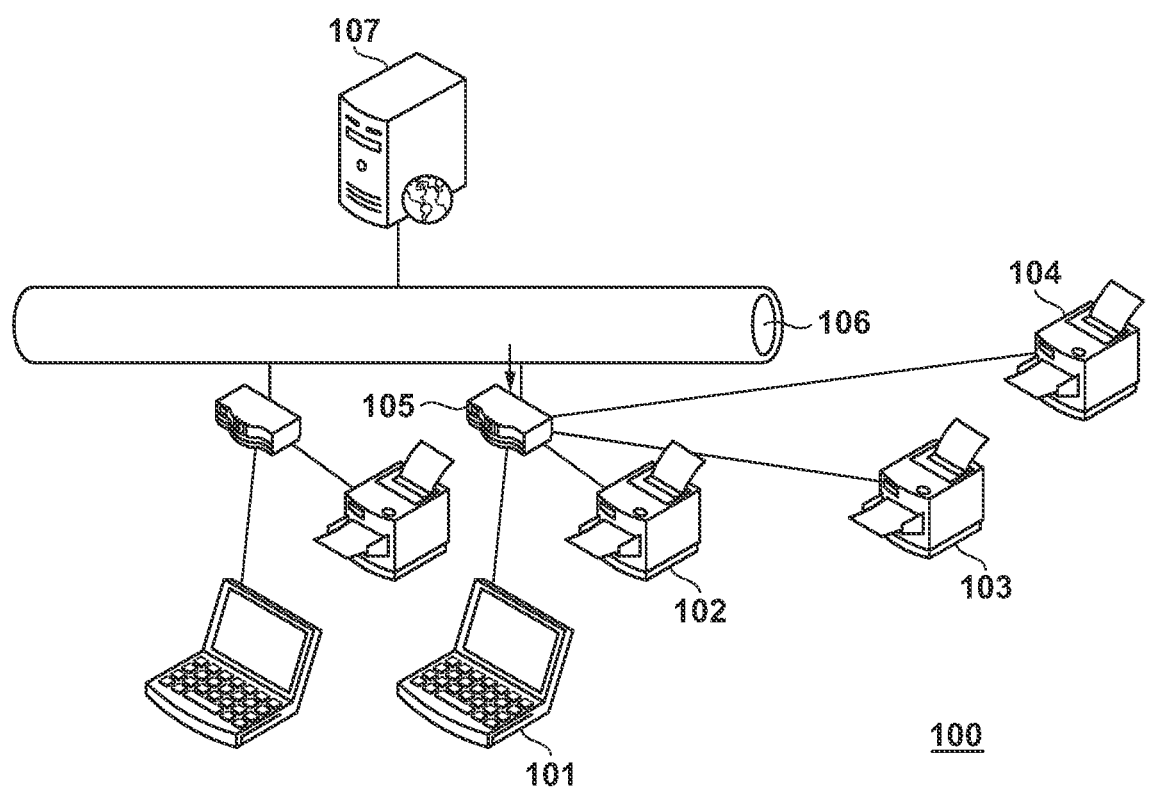
FIG. 1 is a view illustrating an apparatus configuration of a print system.

Embodiments of the present invention will be described hereinafter in detail, with reference to the accompanying drawings. Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same components and a description thereof will be omitted.

The configuration of a print system 100 in the present embodiment will be described with reference to FIG. 1. The user, in the print system 100, by registering to a service provision apparatus (server) 107, and executing predetermined processing, for example an initial setting, on the printing apparatus, can receive flat-rate printing services or the like. A flat-rate printing service is, for example, a service where a flat-rate fee is charged irrespective of amount of ink that is used, and MFPs 102, 103, and 104 are printing apparatuses that a user can use by rental from a service vendor, for example. Also, various settings are included in the initial setting. For example, assume that in the flat-rate printing service, a service of automatically performing delivery in a case of a shortage of ink or paper is provided. In the case of a configuration in which the ink and paper usage amounts are notified to a server from the MFP 102 in order to perform such an automatic delivery service or the like, the foregoing initial setting performs a setting for such a notification. For example, processing for initializing a counter that indicates the ink and paper usage amount is performed. The counter may be a number of pages that have been printed, for example, and the ink and paper usage amounts may be predicted by the number of pages.

As illustrated in FIG. 1, a client terminal 101 and the MFPs (MultiFunction Peripheral) 102, 103, and 104 are connected to a network 106 via a router 105. The network 106 is, for example, the Internet. A service provision apparatus 107 is connected to the network 106. The client terminal 101 and the MFPs 102, 103, and 104 are respectively capable of communicating with each other via the router 105, and are furthermore configured to be able to communicate with the service provision apparatus 107 over the network 106.

In the present embodiment, processing for registering to the service provision apparatus 107 is described as something that is performed for a flat-rate printing service. However, registration processing is not limited to being for a flat-rate printing service, and may be for other Web service such as, for example, an online print service, a print points service, an automatic consumables ordering service, or the like. Also, in the present embodiment, the service provision apparatus 107 is described as a single device, but a plurality of service provision apparatuses 107 may be configured, and processing for registration to a plurality of types of services corresponding to the respective servers and processing for registering to a server that corresponds to a service that the user selected may be performed.

Figure 2:
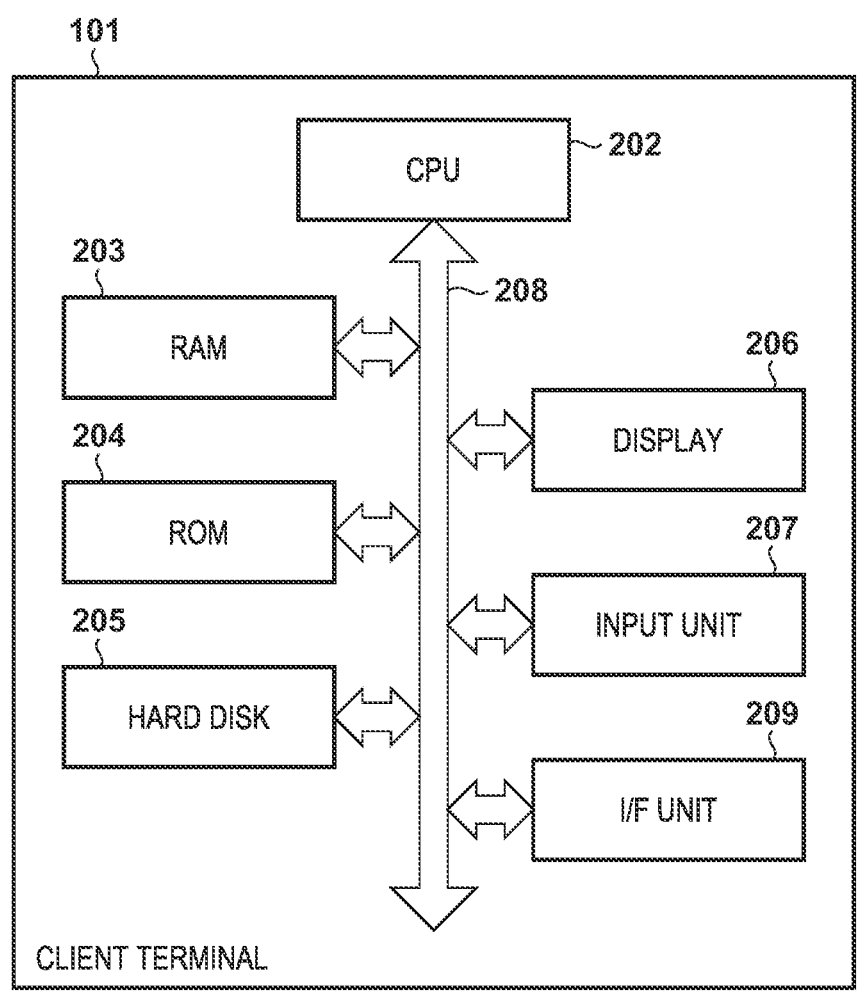
FIG. 2 is a view illustrating a configuration of a client terminal.

Next, description of a configuration of the client terminal 101 is given with reference to FIG. 2. The client terminal 101 has functional blocks of a typical information processing apparatus, and for example, a CPU 202, in accordance with a program stored in a RAM 203, a ROM 204, or a hard disk 205, performs calculations, determinations, and control in relation to data and commands. The RAM 203 is used as a temporary storage region when the CPU 202 performs various processes, for example. The hard disk 205 stores an operating system (OS), application software, a later-described registration program, or the like. Operations of the client terminal 101 in the present embodiment are realized by, for example, the CPU 202 loading a program that is stored in the ROM 204 into the RAM 203 and executing the program.

A display 206 includes a liquid crystal display and a graphic controller. The CPU 202, based on display data that is obtained from an external unit or held internally, displays an object in which a plurality of objects such as images or icons are collected as typified by a shortcut menu or a launcher, or displays various user interface screens such as GUIs on the display 206.

An input unit 207 can receive various operations in relation to the client terminal 101 by the user, and for example, is a pointing device or a keyboard. Via a system bus 208, data transmission/reception is performed between each of the CPU 202, the RAM 203, the ROM 204, the hard disk 205. Also, in an interface (I/F) unit 209, a wireless LAN or a wired LAN that supports a standard such as IEEE 802.11a is used, and data transmission/reception with devices on the same network or on the Internet is possible by using a protocol such as TCP/IP.

Note that in FIG. 2, a case in which in the client terminal 101 is a so-called notebook PC where the display 206 and the input unit 207 are integrated with a control unit including the CPU 202, the RAM 203, and the like is illustrated. However, limitation is not made to the configuration of FIG. 2, and the client terminal 101 may be of a so-called desktop type in which the display 206 and the input unit 207 are separate bodies, and may be of a so-called tablet terminal in which a touch sensor is used as a pointing device.

Figure 3:
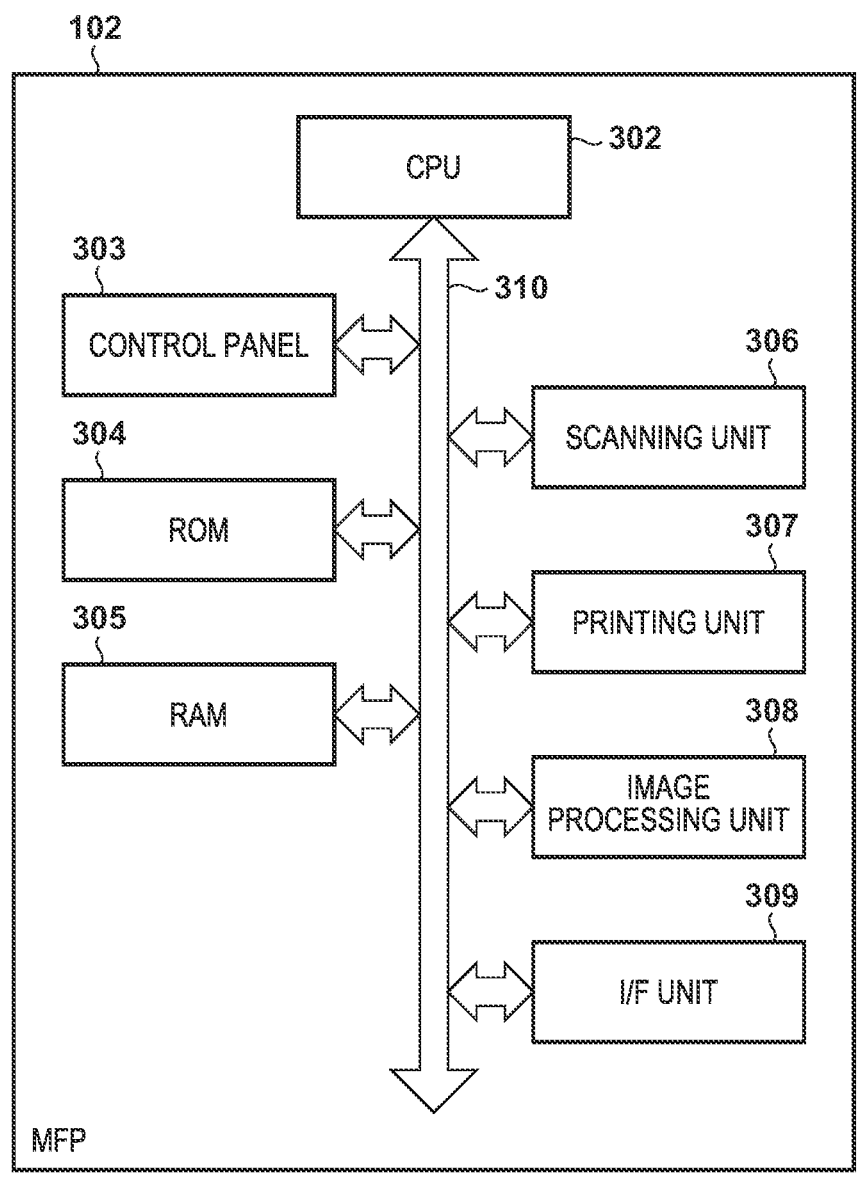
FIG. 3 is a view illustrating a configuration of an MFP.

Next, description will be given with reference to FIG. 3 for the MFPs 102, 103, and 104. Since the MFPs 102, 103, and 104 have the same configuration, hereinafter, unless otherwise noted, the MFP 102 will be described as a representative example of the MFPs 102, 103, and 104. The MFP 102 includes a control panel 303, a ROM 304, a RAM 305, a scanning unit 306, a printing unit 307, an image processing unit 308, an interface (I/F) unit 309, and a system bus 310.

A CPU 302, in accordance with user operations in relation to the control panel 303, for example, executes, in the RAM 305, a program that is stored in the ROM 304, and thereby comprehensively controls the MFP 102. The ROM 304 stores control command programs of the MFP 102. The RAM 305 operates as a working memory for the CPU 302 and is used as a spooler storage region for print jobs. The ROM 304 is a non-volatile memory in which, for example, information that the MFP 102 obtained is stored. For example, a printer ID issued from the service provision apparatus 107 is stored in the ROM 304, and can be stored even in a case where the electric power source of the MFP 102 is cut off. Operations of the MFP 102 in the present embodiment are realized by, for example, the CPU 302 loading a program that is stored in the ROM 304 into the RAM 305 and executing the program.

The control panel 303 is configured to include keys and a touch pad for user operations, and a display for displaying screens for presenting images and various information to a user. The scanning unit 306 is provided with a scanner for optically reading an original placed on an original platen (not shown), and stores image data read by the scanner in the RAM 305.

The printing unit 307 is provided with an ink tank for storing ink as a printing material, a printhead on which nozzles for discharging the ink are provided, and a conveyance unit for conveying a printing medium such as a print sheet. The printing unit 307 forms an image on a printing medium by an inkjet printing method. Note that the printing unit 307 is not limited to an inkjet printing method, and image formation may be performed by another printing method such as an electrophotographic method.

The image processing unit 308, in relation to image data generated by being scanned by the scanning unit 306 or image data that is the target of printing by the printing unit 307, performs various image processing such as image editing, color space conversion and correction, and conversion to a data format that can be processed by the printing unit 307. A copy function is realized by the image processing unit 308 performing image processing for printing by the printing unit 307 image data scanned by the scanning unit 306, for example. In the I/F unit 309, wireless LAN which corresponds to an IEEE 802.11a standard or the like and wired LAN are used, and data transmission/reception with a device on the same network or on the Internet is possible by a protocol such as TCP/IP.

Figure 4:
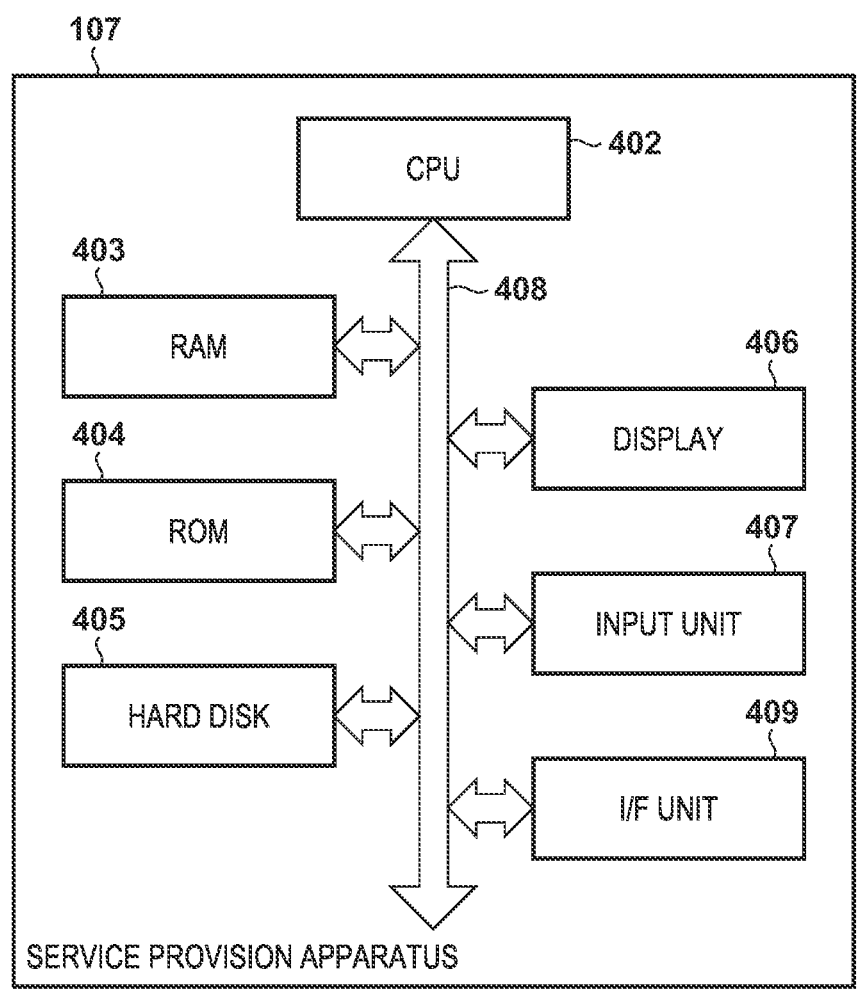
FIG. 4 is a view illustrating a configuration of a service provision apparatus.

Next, with reference to FIG. 4, description is given of a configuration of the service provision apparatus 107 which is for providing a flat-rate printing service. A CPU 402, in accordance with a program stored in a RAM 403, a ROM 404, or a hard disk 405, performs calculations, determinations, and control in relation to data and commands. The RAM 403 is used as a temporary storage region when the CPU 402 performs various processes, for example. The hard disk 405 stores an operating system (OS), application software, a later-described registration program, or the like. Operations of the service provision apparatus 107 in the present embodiment are realized by, for example, the CPU 402 loading a program that is stored in the ROM 404 into the RAM 403 and executing the program.

A display 406 includes a liquid crystal display and a graphic controller. The CPU 402, based on display data, performs display, on the display 406, of an object in which a plurality of objects such as images and icons are collected, as typified by a shortcut menu or a launcher, for example, or display of various user interface screens such as a GUI. An input unit 407 can receive various operations in relation to the service provision apparatus 107 by the user, and for example, is a pointing device or a keyboard. Via a system bus 408, data transmission/reception is performed between each of the CPU 402, the RAM 403, the ROM 404, and the hard disk 405. Also, in an interface (I/F) unit 409, a wireless LAN or a wired LAN that supports a standard such as IEEE 802.11a is used, and data transmission/reception with devices on the same network or on the Internet is possible by using a protocol such as TCP/IP.

Software that is saved on the hard disk 405 of the service provision apparatus 107 differs from software saved on the hard disk 205 of the client terminal 101. The software saved on the hard disk 405 is a flat-rate service registration page creation program for generating a flat-rate service registration page when a flat-rate service registration page access is received from a browser of the client terminal 101, for example. Also, for example, the software is a flat-rate service registration program for performing registration processing based on information inputted on the flat-rate service registration page. Also, in the hard disk 405, for example, a registration information management database for managing flat-rate service registration information is saved. Note that, while described later, the aforementioned flat-rate service registration page creation program receives device identification information of the MFP 102 and an initial process execution URL by a browser of the client terminal 101, and generates a flat-rate service registration page.

Figure 5:
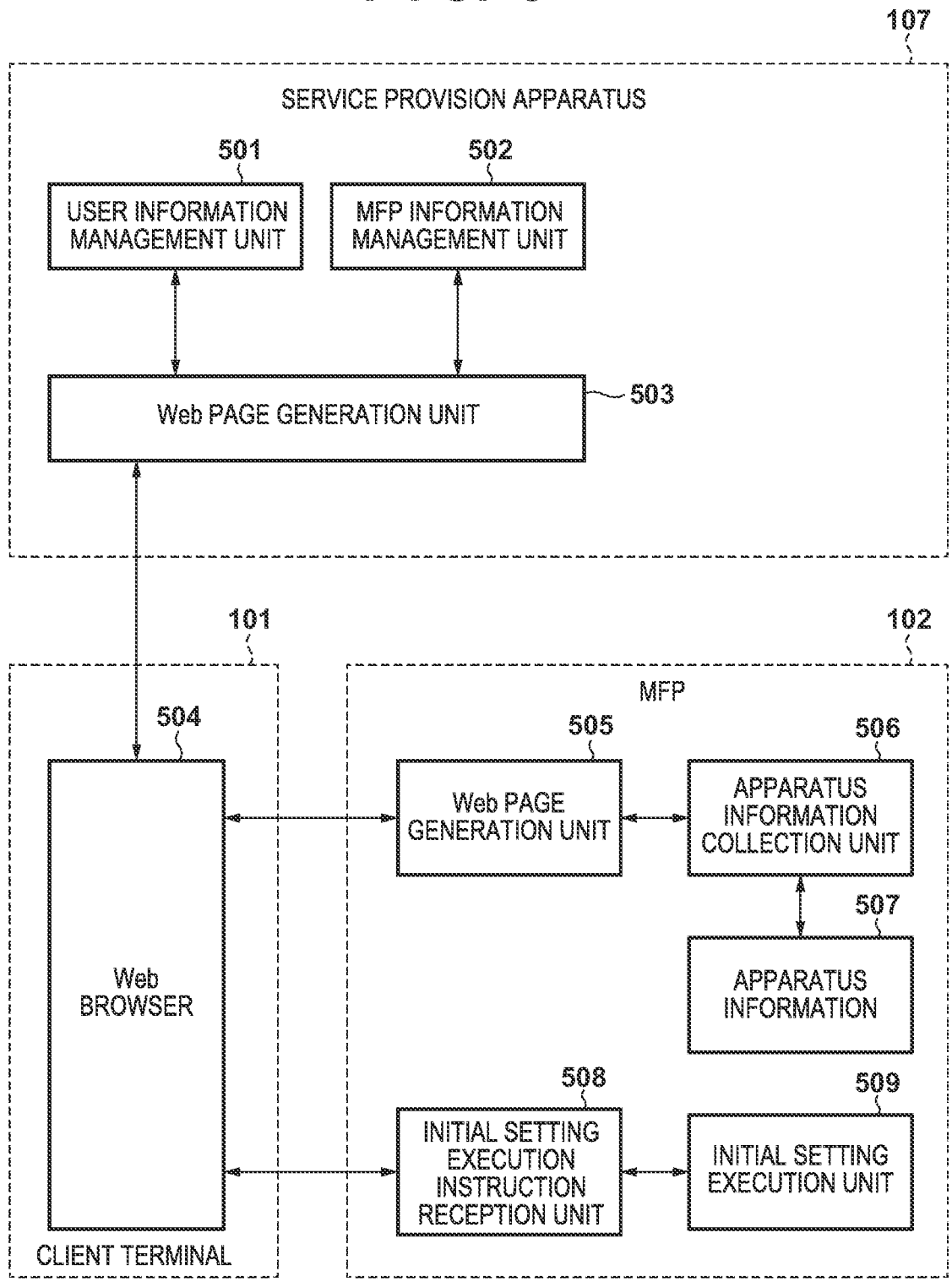
FIG. 5 is a view illustrating a functional block configuration of a print system.

FIG. 5 is a view illustrating a functional block configuration of the service provision apparatus 107, the client terminal 101, and the MFP 102 in the flat-rate printing service system of the present embodiment. The service provision apparatus 107 includes a Web page generation unit 503 for generating a Web page for responding to a request from a Web browser 504 of the client terminal 101. Here, the Web page generation unit 503 generates data for various operation screens in order to provide a flat-rate printing service to the client terminal 101, for example. In the operation screen, for example, there is a registration information input screen for registering to a flat-rate printing service and a usage status display screen for confirming a usage status of the flat-rate printing service. In this way, the Web page generation unit 503 has a Web service registration management function and a Web service usage status screen generation function. Also, the service provision apparatus 107 includes a user information management unit 501 for managing information of users who use the flat-rate printing service and an MFP information management unit 502 for managing information of the MFPs 102 that the users use.

The client terminal 101 includes the Web browser 504. The Web browser 504 of the client terminal 101, via the communication interface 209, transmits a request to the service provision apparatus 107 the MFP 102, and displays a Web page that is returned as a response. In this way, the client terminal 101 has a request transmission function and a Web page browsing function that use the Web browser 504.

The MFP 102 includes a Web page generation unit 505 for generating Web pages for responding to requests from the client terminal 101 and an apparatus information collection unit 506 for collecting apparatus information 507 of the MFP 102. The apparatus information 507 is apparatus identification information such as a serial number or address of the MFP 102, for example, and the apparatus information collection unit 506 collects and holds the apparatus information 507 when the MFP 102 is activated, for example. Also, the MFP 102, via the I/F unit 309, includes an initial setting execution instruction reception unit 508 for receiving an instruction to execute an initial setting for starting the flat-rate printing service from the client terminal 101 and an initial setting execution unit 509 for executing an initial setting of the MFP 102 upon receipt of the instruction for executing the initial setting.

Figure 6:
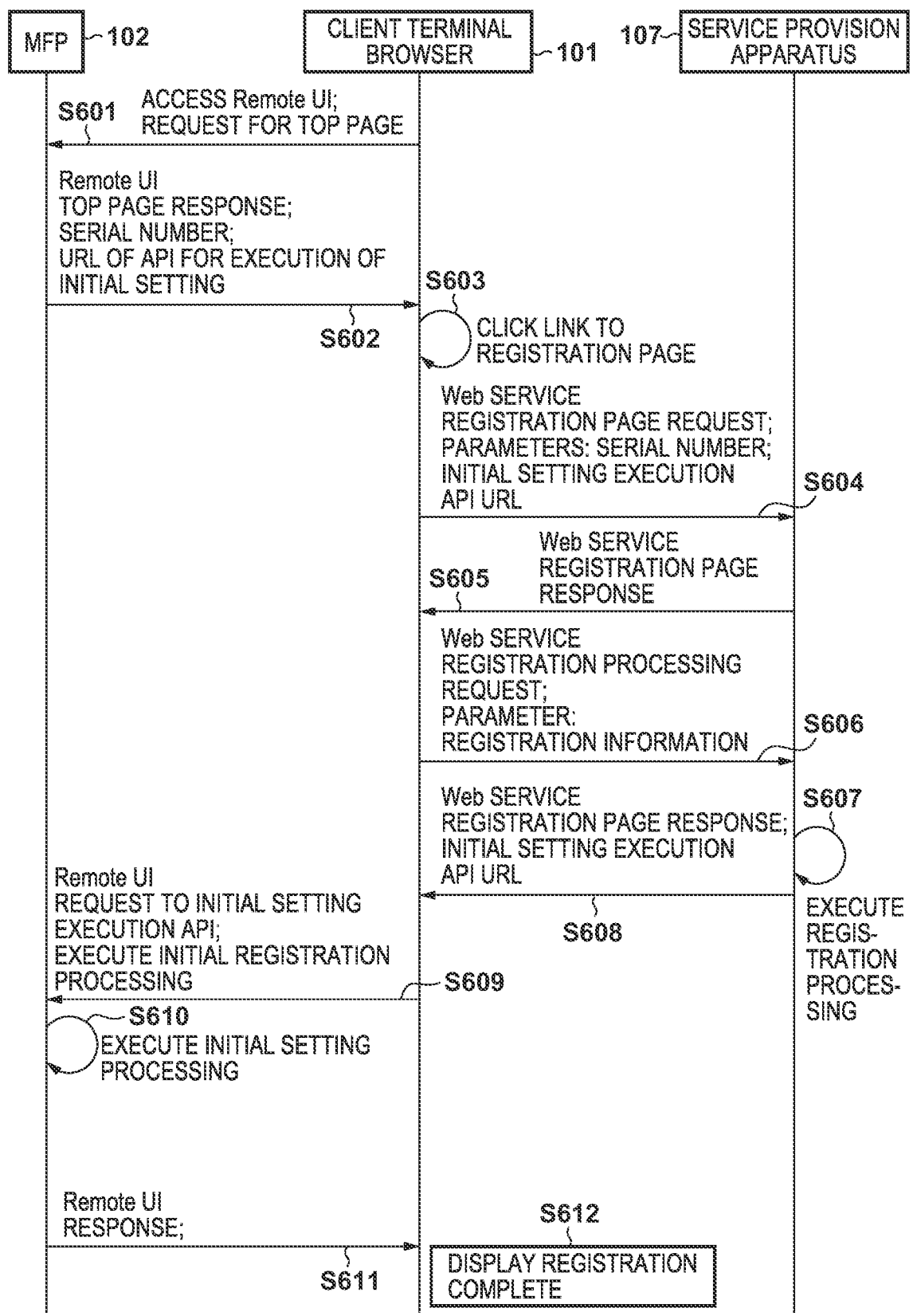
FIG. 6 is a view illustrating processing up until an MFP is registered to a service provision apparatus.

FIG. 6 is a view illustrating processing for registration to the service provision apparatus 107 in the present embodiment. In the present embodiment, the processing for registration to the service provision apparatus 107 includes registration of printing apparatus information and execution of the printing apparatus initial setting. First, in step S601, the CPU 202 of the client terminal 101 receives an instruction from a user for activating Remote UI of the MFP 102. "Remote UI" is software used, by an access from a Web browser via a network, for status confirmation, job operation, and various settings, for example. For example, the user logs in as a printer administrator to the client terminal 101, and inputs a URL in the Web browser. The CPU 202 of the client terminal 101, having received the user instruction, transmits by the Web browser 504 a request for a TOP page of Remote UI in relation to the MFP 102. As a method for the user to access the TOP page 701 of Remote UI, configuration may also be taken such that, as a method other than that described above, for example, a local area printer administrator notifies the URL of the TOP page of Remote UI to a user by an email. Alternatively, configuration may also be taken such that the user uses a URL of the MFP posted on a homepage that can be accessed within a company.

In step S602, when the CPU 302 of the MFP 102 receives the request for the TOP page, the CPU 302 obtains the apparatus information 507 of the MFP 102 by the apparatus information collection unit 506. Below, the apparatus information 507 will be described as a serial number. Then, the CPU 302, by the Web page generation unit 505, generates data (Web page data) of TOP page of Remote UI including a link to the URL of a page for registering to the flat-rate printing service in which the serial number of the MFP 102 and the URL of an initial setting execution API are set as parameters. Then, the CPU 302 of the MFP 102 replies to the client terminal 101 with Web page data for displaying a screen 701 of FIG. 7. The CPU 202 of the client terminal 101, by the Web browser 504, remotely displays the TOP page of Remote UI of FIG. 7 based on the Web page data of the response from the MFP 102.

FIG. 7 is a view that illustrates an example of a screen of the TOP page of Remote UI of the MFP 102 in the present embodiment. The screen illustrated in FIG. 7 is displayed on the client terminal 101. As illustrated in FIG. 7, a plurality of menus that can be selected by a user are displayed on the TOP page 701, and "Web service registration" is displayed as a selected item 702. In a selection item 702 of the TOP page 701 of Remote UI, as a parameter, a hyperlink to a URL of a page for registering to a flat-rate printing service that includes the serial number of the MFP 102 and the URL for the initial setting execution API is set. Also, a destination address that is the same as the hyperlink set in the selection item 702 is displayed as a link 703, and the user can access the service provision apparatus 107 by clicking the selection item 702 or the link 703, as an instruction to register to the Web service on the TOP page 701.

Next, in step S603, the CPU 202 of the client terminal 101 receives a user registration instruction via the Web page. Then, in step S604, the CPU 202, by the Web browser 504, transmits a request for a Web page that the URL of the flat-rate printing service registration page set to the hyperlink indicates to the service provision apparatus 107. Here, the user registration instruction is a click operation on the selection item 702 for which the hyperlink is set, for example. As described above, the URL for the page for registering to the flat-rate printing service includes a serial number and a URL for the initial setting execution API.

Accordingly, together with a request for a Web page that the URL of the flat-rate printing service registration page indicates, the above-described serial number and the URL of the initial setting execution API are transmitted to the service provision apparatus 107.

When the CPU 402 of the service provision apparatus 107 receives a request for the Web page from the client terminal 101, the CPU 402, by the Web page generation unit 503, generates Web page data for the flat-rate printing service registration page in which the serial number received as a parameter is embedded. Then, in step S605, the CPU 402 of the service provision apparatus 107 responds with Web page data for the flat-rate printing service registration page to the client terminal 101. The CPU 202 of the client terminal 101, by the Web browser 504, displays the flat-rate printing service registration page illustrated in FIG. 8 based on the Web page data of the response from the service provision apparatus 107.

FIG. 8 is a view illustrating an example of a screen of the flat-rate printing service registration page in the present embodiment. In a service registration page 801, the serial number of the printer set as the parameter of the link 703 is reflected in a display field 802. In a selection field 803, a menu of plans for the flat-rate printing service that a user can use is displayed selectably. By the user selecting a desired flat-rate printing service plan in the selection field 803 and clicking a register button 804, a flat-rate printing service registration request is transmitted to the service provision apparatus 107.

In step S606, when the CPU 202 of the client terminal 101 receives a user registration instruction via the flat-rate printing service registration page of FIG. 8, the CPU 202 transmits a request for a flat-rate printing service registration to the service provision apparatus 107 by the Web browser 504. The user registration instruction here is a flat-rate printing service plan selection in the selection field 803 and a click operation on the register button 804. Also, though not shown graphically in FIG. 8, a field for inputting a user name and a password may be provided on the screen 801, and authentication may be performed by the service provision apparatus 107 based on such information. Also, regarding authentication, after step S606, a phase in which transmission/reception of a user authentication page is performed may be executed. For example, the CPU 202 of the client terminal 101 transmits a request for a user authentication page to the service provision apparatus 107. When the CPU 402 of the service provision apparatus 107 receives the request, the CPU 402 responds with a user authentication page that can receive a user name and a password by the Web page generation unit 503. Then, the CPU 202 of the client terminal 101, by the Web browser 504, displays the user authentication page. When, via the user authentication page, a user name and a password and the pressing of a login button or the like are received, a request for user authentication is transmitted to the service provision apparatus 107. The CPU 402 of the service provision apparatus 107 performs authentication processing based on the received user name and password, and responds with the authentication result to the client terminal 101 as a response.

In step S607, when the CPU 402 of the service provision apparatus 107 receives a flat-rate printing service registration request, the CPU 402 performs user registration processing by the user information management unit 501 and performs MFP registration processing by the MFP information management unit 502. For example, the serial number of the MFP 102 is stored together with user information in the registration information management database of the hard disk 405. In step S608, the CPU 402 of the service provision apparatus 107 responds with Web page data in which the initial setting execution API which is set as a parameter when the request for the flat-rate printing service registration page was received in step S604 by the Web page generation unit 503 is embedded executably. The CPU 202 of the client terminal 101, by the Web browser 504, displays a screen illustrated in FIG. 9 based on the Web page data of the response from the service provision apparatus 107.

Figure 9:
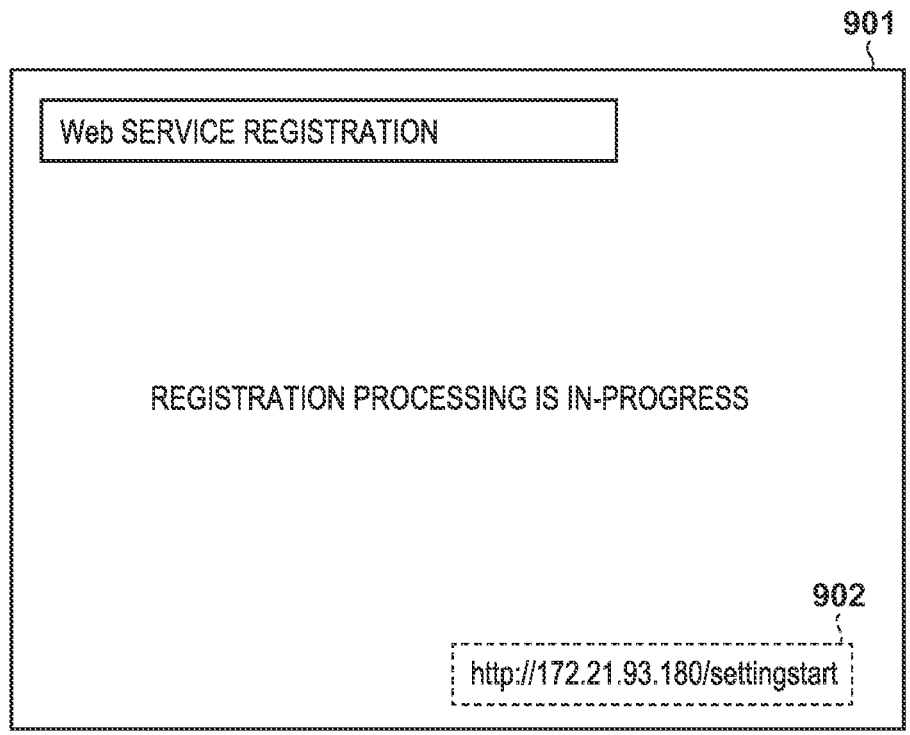
FIG. 9 is a view illustrating a screen indicating "registration processing is in-progress".

FIG. 9 is a view that illustrates an example of a screen for indicating "registration processing is in-progress" in which is embedded for execution the initial setting execution API of the MFP 102. In the screen 901, since an initial setting of the MFP 102 has yet to be executed at the current time even though registration processing on the service provision apparatus 107 has ended, a message of "registration processing in-progress" that indicates to the user that registration processing is ongoing is displayed. Also, in the screen 901, a URL 902 of the initial setting execution API is embedded, so as to be hidden, as an instruction for executing the initialization processing of the MFP 102. By making the URL 902 hidden, the user is not unnecessarily made to be aware of the initial setting of the MFP 102.

In step S609, the CPU 202 of the client terminal 101 transmits, to the MFP 102, the MFP 102 initial setting execution request in order to execute the initial setting execution API embedded in the Web page of the screen 901. In step S610, when the CPU 302 of the MFP 102 receives the initial setting execution request, the CPU 302 executes the initial setting. Then, in step S611, the MFP 102, by the Web page generation unit 505, generates Web page data in which a message that the flat-rate printing service registration succeeded is embedded, and replies to the client terminal 101 with it as a response. In step S612, the CPU 202 of the client terminal 101, based on Web page data returned as the response, displays the screen of FIG. 10.

Figure 10:
FIG. 10 is a view illustrating a screen indicating a flat-rate printing service registration completion.

FIG. 10 is a view illustrating an example of a screen of the flat-rate printing service registration completion page that notifies that the MFP 102 flat-rate printing service registration is complete. A Web service registration completion page 1001, after the MFP 102 initial setting is complete, is transmitted from the MFP 102 to the client terminal 101. Accordingly, after the Web service registration completion page 1001 is displayed, the user can use the flat-rate printing service that the service provision apparatus 107 provided.

As described above, by virtue of the present embodiment, upon instruction of registration processing on a user interface screen, both registration of the printing apparatus for a Web service and initial setting of the printing apparatus related to the Web service are executed. Since it is not necessary to make an instruction for initial setting separately to the registering of the printing apparatus, it is possible to improve convenience in a case where the user uses a Web service. The user performs all Web service registration processing by operations on a Web page. In other words, if the Web browser 504 is implemented on the client terminal 101, it is possible to perform processing for Web service registration to the service provision apparatus 107, and it is possible to perform a simple configuration without the need to use an independent communication protocol.

Also, in the processing for registering a Web service, the operations that the user performs on the Web page is the menu selection ("Web service registration") on the menu screen of FIG. 7 and the plan selection on the screen of FIG. 8. In other words, it is not necessary to input the serial number of the MFP 102 and perform execution of the MFP 102 initial setting and so it is possible to improve user convenience.

Also, as illustrated in FIG. 9, at the point in time of step S607 where the MFP 102 registration has ended, execution of the MFP 102 initial setting has not been performed yet, and therefore "registration processing is in-progress" is displayed to the user. Then, as illustrated in FIG. 10, when the initial setting of the MFP 102 ends, "registration complete" is displayed. By such a configuration, it is clearly shown to the user that registration is in-progress, and the user is not unnecessarily made to be aware of the initial setting of the MFP 102.

In FIG. 6, in step S608, the service provision apparatus 107 is described as responding to the client terminal 101 with embedded Web page data so as to execute the initial setting execution API. However, the service provision apparatus 107 may directly transmit to the MFP 102 a command for requesting execution of the initial setting execution API. In such a case, the processing of step S609 is not performed, and when the MFP 102 receives a request command, the MFP 102 transmits the Web page data for causing the screen of FIG. 9 to be displayed on the client terminal 101. Note that the timing at which the initial setting instruction to the MFP 102 is executed by the client apparatus 101 in step S609 is not limited to the response from the service provision apparatus 107 in step S606. For example, in accordance with the link click in step S603, the initial setting instruction may be executed together with the transmission in step S604. However, as illustrated in FIG. 6, by the initial setting instruction being executed in accordance with the response from the service provision apparatus 107 in step S606, the initial setting is performed after having confirmed that the MFP 102 is registered on the service provision apparatus 107. For this reason, it is possible to prevent the initial setting from being performed unnecessarily irrespective of the MFP 102 not being registered to the service provision apparatus 107.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-125279, filed Jun. 29, 2018, which is hereby incorporated by reference herein in its entirety.

What is claimed is:

1. A communication method executed by a printing apparatus and an information processing apparatus operable to communicate with the printing apparatus and a server for providing a Web service, the method comprising:
   obtaining, by the information processing apparatus from the printing apparatus, apparatus information of the printing apparatus;
   displaying, by the information processing apparatus, a user interface screen of the printing apparatus;
   in accordance with receiving an instruction to register to the Web service from the user interface screen, transmitting, by the information processing apparatus, to the server the apparatus information of the obtained printing apparatus; and
   making an instruction, by the information processing apparatus to the printing apparatus, for execution of a predetermined setting related to the Web service,
   wherein,
   both the transmission and the instruction are executed in accordance with the instruction to register.

2. The information processing method according to claim 1, wherein in the displaying, based on display data for displaying the user interface screen obtained from the printing apparatus, the user interface screen is displayed by a Web browser.

3. The information processing method according to claim 2, wherein both the display data and the apparatus information are obtained in the obtaining.

4. The information processing method according to claim 3, wherein
   information for instructing execution of the predetermined setting by the instructing is obtained from the printing apparatus when obtaining the apparatus information of the printing apparatus and the display data.

5. The information processing method according to claim 4, wherein the instruction by the instructing is executed in accordance with a response based on the transmission in the transmitting.

6. The information processing method according to claim 5, wherein the response is a notification that registration of the apparatus information of the printing apparatus transmitted in the transmitting was performed.

7. The information processing method according to claim 1, wherein information for instructing execution of the predetermined setting is further transmitted in the transmitting.

8. The information processing method according to claim 7, further comprising
   receiving, by the information processing apparatus from the server, second display data, including information for instructing execution of the predetermined setting, as a notification that registration of the apparatus information of the printing apparatus was performed;

displaying, by the information processing apparatus, a second user interface screen based on the second display data received in the receiving.

9. The information processing method according to claim 8, further comprising
receiving, by the information processing apparatus from the server, third display data for displaying a menu screen of the Web service; and
displaying a third user interface screen based on the third display data.

10. The information processing method according to claim 9, wherein after a selection of a menu on the menu screen, the second display data is received from the server.

11. The information processing method according to claim 8, wherein the second display data is data for displaying that registration to the Web service is ongoing.

12. The information processing method according to claim 8, wherein the information for instructing the execution of the predetermined setting included in the second display data is not displayed.

13. The information processing method according to claim 1, further comprising displaying by the information processing apparatus, when a notification that the execution of the predetermined setting ended is received from the printing apparatus, that registration to the Web service ended.

14. The information processing method according to claim 1, wherein a URL of an API in the printing apparatus is transmitted as the information for instructing execution of the predetermined setting.

15. The information processing method according to claim 1, wherein
the instruction to register to the Web service in the user interface screen is a selection of an icon, and
a destination of the server and apparatus information of the printing apparatus are set as a hyperlink for the icon.

16. The information processing method according to claim 1 wherein the apparatus information of the printing apparatus is a serial number of the printing apparatus.

17. An information processing apparatus operable to communicate with a printing apparatus and a server for providing a Web service, the information processing apparatus comprising:
an obtaining unit configured to obtain, from the printing apparatus, apparatus information of the printing apparatus;
a display unit configured to display a user interface screen of the printing apparatus;
a transmission unit configured to, in accordance with receiving an instruction to register to the Web service from the user interface screen, transmit to the server the apparatus information of the printing apparatus obtained by the obtaining unit; and
an instructing unit configured to make an instruction, to the printing apparatus, for execution of a predetermined setting related to the Web service, wherein
both the transmission by the transmission unit and the instruction by the instructing unit are executed in accordance with the instruction to register.

18. A system including a printing apparatus, a server for providing a Web service, and an information processing apparatus, wherein
the information processing apparatus comprises:
a reception unit configured to receive from the printing apparatus display data for displaying a user interface screen of the printing apparatus, and information for instructing execution of an initial setting of the printing apparatus and apparatus information of the printing apparatus;
an obtaining unit configured to obtain, from the printing apparatus, apparatus information of the printing apparatus;
a display unit configured to display the user interface screen of the printing apparatus;
a first transmission unit configured to, in accordance with receiving an instruction to register to the Web service from the user interface screen, transmit to the server the apparatus information of the printing apparatus obtained by the obtaining unit; and
an instructing unit configured to make an instruction, to the printing apparatus, for execution of a predetermined setting related to the Web service,
and wherein the printing apparatus comprises:
a second transmission unit configured to transmit to the information processing apparatus the display data and information for instructing execution of an initial setting of the printing apparatus and apparatus information of the printing apparatus;
a third transmission unit configured to transmit the apparatus information of the printing apparatus to the information processing apparatus; and
an execution unit configured to, based on an instruction for execution of a predetermined setting related to the Web service, execute the predetermined setting, wherein
both the transmission by the first transmission unit and the instruction by the instructing unit are executed in accordance with the instruction to register.

* * * * *